(12) United States Patent
Kobayashi et al.

(10) Patent No.: US 8,142,869 B2
(45) Date of Patent: Mar. 27, 2012

(54) COATED BASE FABRIC FOR AIRBAGS

(75) Inventors: Hiroyuki Kobayashi, Aichi-ken (JP);
Ichizo Shiga, Aichi-ken (JP); Yasuji Ozaki, Aichi-ken (JP)

(73) Assignees: Toyoda Gosei Co., Ltd., Aichi-pref. (JP); Sumitomo Seika Chemicals Co., Ltd., Hyogo-ken (JP)

( * ) Notice: Subject to any disclaimer, the term of this patent is extended or adjusted under 35 U.S.C. 154(b) by 495 days.

(21) Appl. No.: 12/232,390

(22) Filed: Sep. 16, 2008

(65) Prior Publication Data

US 2009/0087601 A1   Apr. 2, 2009

(30) Foreign Application Priority Data

Sep. 27, 2007  (JP) ................................ 2007-251998
Jul. 31, 2008  (JP) ................................ 2008-198725

(51) Int. Cl.
*B60R 21/16* (2006.01)
*B05D 3/02* (2006.01)
*B32B 5/02* (2006.01)
*B32B 27/02* (2006.01)
*B32B 27/04* (2006.01)
*B32B 27/06* (2006.01)
*B32B 27/08* (2006.01)
*B32B 27/12* (2006.01)
*B32B 27/34* (2006.01)

(52) U.S. Cl. ............ 428/36.1; 442/59; 442/63; 442/168; 280/728.1; 280/743.1; 427/385.5

(58) Field of Classification Search .................. 428/34.1, 428/36.1, 36.2, 36.5; 442/59, 62–67, 71, 442/76, 77, 168; 280/728.1–743.2; 427/385.5
See application file for complete search history.

(56) References Cited

U.S. PATENT DOCUMENTS 4,808,675 A   2/1989  Twilley et al.
5,153,275 A   10/1992 Chacko et al.
(Continued)

FOREIGN PATENT DOCUMENTS

CN   1703550 A   11/2005
(Continued)

OTHER PUBLICATIONS

Bozhi Li, et al. "Recycling and Utilization of Waste Plastics", China Academic Journal Electronic Publishing House, Mar. 2007, pp. 29-31 (with an English translation).

(Continued)

*Primary Examiner* — Walter B Aughenbaugh
(74) *Attorney, Agent, or Firm* — Posz Law Group, PLC

(57) ABSTRACT

The present invention provides a coated base fabric for airbags including: a cloth obtained by weaving polyamide (PA) fiber yarns; and a PA elastomer coating film formed on one surface or both surfaces of the cloth, wherein the coated base fabric has predetermined air tightness and flexibility, is easily converted to a PA reproduced material, and is obtained by fusing a coating film (16) made of an airflow suppression PA elastomer on one surface or both surfaces of a cloth (14) obtained by weaving yarns (12) and (12A) made of a polyamide (PA) fiber, as the PA elastomer, soft PA is normally used, which has a melting point (measured by the standard of ASTM D3418) of 135 to 200° C., a difference between the melting points of the PA fiber and PA elastomer being 80 to 120° C.

8 Claims, 5 Drawing Sheets

U.S. PATENT DOCUMENTS

| | | | |
|---|---|---|---|
| 5,612,124 A * | 3/1997 | Krummheuer et al. | 442/181 |
| 5,883,195 A | 3/1999 | Couchoud et al. | |
| 5,936,044 A | 8/1999 | Melot et al. | |
| 1,518,761 A1 | 3/2007 | Schulthess | |
| 2007/0031621 A1 | 2/2007 | Morimoto et al. | |
| 2007/0065614 A1 * | 3/2007 | Schulthess | 428/36.1 |

FOREIGN PATENT DOCUMENTS

| | | |
|---|---|---|
| EP | 1 044 803 | 10/2000 |
| EP | 1 518 761 | 3/2005 |
| JP | B2-S48-029932 | 9/1973 |
| JP | A-04-201649 | 11/1990 |
| JP | A-H06-81274 | 3/1994 |
| JP | A-H07-186859 | 7/1995 |
| JP | A-2002-327350 | 11/2002 |
| JP | A-2004-176221 | 6/2004 |
| JP | A-2004-218138 | 8/2004 |
| JP | A-2006-249655 | 9/2006 |
| JP | A-2008-13897 | 1/2008 |
| JP | A-2008-013897 | 1/2008 |
| WO | WO 96/17003 | 6/1996 |

OTHER PUBLICATIONS

European Search Report dated Feb. 20, 2009 in corresponding European patent application No. 08016288.6-2124.

* cited by examiner

COATED BASE FABRIC FOR AIRBAGS

BACKGROUND OF THE INVENTION

1. Field of the Invention

The present invention relates to a coated base fabric for airbags and a polyamide (PA) reproduced material made of a waste material of the coated base fabric.

2. Description of the Related Art

Airbag devices for protecting occupants are mounted in vehicles. Examples of base fabrics for airbags incorporated in the airbag devices include the following two types: a cloth (uncoated base fabric) obtained by weaving (normally plain weaving) PA fiber yarns (for example, nylon 66); and a coated cloth (coated base fabric) obtained by forming an elastomer coating film on one surface or both surfaces of the cloth.

All vehicles should be installed with airbag devices, which include one for a front passenger seat, as standard equipment. Recently, a waste material of a base fabric for airbags (including scraps generated in cutting the base fabric, hereinafter, the same) is generated in a large amount.

A request for recycling (reusing) the above waste material of the base fabric as a PA reproduced material from the viewpoint of the formation of a recycling society has increased.

Since the uncoated base fabric, which is made of only the PA fiber yarn, is easily reproduced, the recycling of the uncoated base fabric has been put into practice.

However, as shown in Patent Documents 1 to 3, the coated base fabric obtained by coating a silicone rubber or a silicone resin on a cloth made of a PA fiber yarn has become major.

Patent Document 1 describes "a chloroprene rubber, a chlorosulfonated rubber and a silicone rubber" as a coating film material of an elastomer coating film in paragraph 0013. Patent Document 2 describes "a silicone resin, a polyurethane resin and a polyamide-based resin" in paragraph 0061. Patent Document 3 describes "chloroprene, chlorosulfonated olefin, a silicone rubber and a polyamide-based elastomer . . . ." Each of Patent Documents teaches that "a silicone rubber (a silicone resin)" has excellent heat resistance in Examples or "the silicone rubber (a silicone resin)" is particularly preferable.

Before the filing of the present application, it was considered common knowledge for those skilled in the art that "a material of an elastomer coating film must be a rubber or resin having excellent heat resistance equivalent or superior to that of a cloth."

In Patent Documents 2 and 3, the PA elastomer is also exemplified as the forming material of the elastomer coating film. However, the present inventors imagine that the recycling of the PA elastomer is not naturally predetermined, and a PA elastomer having a low melting point of the present invention is not predetermined from the above description. However, when such a PA elastomer having a high melting point is used, the present inventors assume that the flexibility of the base fabric is difficult to secure while securing required air tightness (low airflow amount) of the base fabric.

Since a request for securing quicker and more highly precise initial restrictiveness as the function of the airbag in order to protect the occupants has increased particularly in recent years, higher air tightness has been increasingly required from the viewpoint of the development characteristics of the airbag. On the other hand, the required flexibility (low impact resilience) is also an indispensable requirement from the viewpoint of the folding quality of the airbag and the above development characteristics of the airbag.

Generally, common knowledge of those skilled in the art is that a trade-off request exists between the above high air tightness and flexibility of the coated base fabric. That is, it is necessary to form a relatively thick-walled coating film in order to secure high air tightness. However, the thickened coating film increases the mass of the airbag. Alternatively, the thickened coating film relatively increases the impact resilience, and thereby the flexibility of the airbag is difficult to secure. In addition, the thickened coating film has an adverse effect on the folding quality.

Patent Documents 4 and 5 teach the same PA elastomer (soft PA) as that of the present invention as the coating film material of the elastomer coating film.

That is, claim 1 of Patent Document 4 teaches that "a base fabric for airbags composed of a synthetic fiber yarn, wherein the base fabric is impregnated with a water-soluble or water-dispersible synthetic resin, and the synthetic resin is formed into a film having 0.3 mm thickness and the resin has tensile elongation of 200% or more and strength of 5 MPa or less in 200% tension when carrying out a tensile test under conditions of a 35 mm distance between chucks and a 300 mm/min tensile speed using a tensile tester." Claim 2 of Patent Document 4 teaches that "the synthetic resin is selected from a polyurethane resin, an acrylic resin, a polyester resin and a polyamide resin." Furthermore, paragraph 0028 of Patent Document 4 teaches "TORESIN (trade name, manufactured by Teikoku Chemical Industry Co., Ltd., N-methoxymethylated nylon)" as a preferred example as soft PA.

However, the present inventors assume that predetermined air tightness is difficult to secure in the soft PA (PA elastomer). This is because according to the article description (Nagase ChemteX Corporation issue) of "TORESIN," "TORESIN F-30K," which has water vapor permeability ($g \cdot cm/cm^2 \cdot s \cdot cmHg \times 10^{12}$: 38° C., 24 h, 25 μm film thickness) of "3060," shows a value close to "3800" of "regenerated cellulose" and has water vapor permeability of 20 times or more of "160" of "nylon 6."

And, "TORESIN," which is alcohol-soluble nylon, is predetermined as a solution type coating material. Therefore, it is assumed that resin forming a coating film intrudes into the clearance of the cloth and to secure the flexibility of the coated base fabric become difficult.

Further, Patent Document 5 teaches a dried coating film formed on one surface of a cloth made of nylon 66, the coating film made of a PA elastomer (a block copolymer containing a soft segment as amino-modified polyether). However, referring to the drying temperature of the coating film in the document, the drying finish temperature is 110° C. in Example 1 (a paragraph 0018). It is difficult to presume that the PA elastomer is melted and the coating film is fused on the cloth.

Patent Document 1: Japanese Published Patent Application No. H6-81274 A

Patent Document 2: Japanese Published Patent Application No. 2004-176221 A

Patent Document 3: Japanese Published Patent Application No. 2006-249655 A

Patent Document 4: Japanese Published Patent Application No. 2004-218138 A

Patent Document 5: Japanese Published Patent Application No. 2008-13897 A

SUMMARY OF THE INVENTION

It is an object (a problem) of the present invention to provide a coated base fabric for airbags including: a cloth obtained by weaving PA fiber yarns; and a PA elastomer coating film formed on one surface or both surfaces of the cloth, wherein the coated base fabric has predetermined air tightness and flexibility, and is easily converted to a PA reproduced material in view of the above description.

The present invention solves the above problems (objects) using the following constitution.

A coated base fabric for airbags comprises: a cloth obtained by weaving yarns made of a polyamide (PA) fiber; and a coating film formed on at least one surface of the cloth, the coating film made of a PA elastomer, wherein the PA elastomer has a melting point (measured by the standard of ASTM D3418; hereinafter, the expression "ASTM DXXXX" will be understood to mean "measured by the standard of ASTM DXXXX") of 135 to 200° C.; a difference between the melting points of the PA elastomer and PA fiber is 80 to 120° C.; and the coating film is fused on the cloth.

A method for producing a coated base fabric for airbags according to the present invention has the following constitution.

A method for producing the coated base fabric for airbags of the present invention, wherein a water dispersion-based coating material having a polymer particle diameter of 0.05 to 5 μm is used as a coating material of the above coating film; and the coating material is heat-treated at a temperature higher than the melting point of the PA elastomer by 5 to 30° C. for 0.5 to 5 minutes after the coating material is coated to form the coating film.

A PA reproduced material of the present invention is obtained, in order, by crushing or pulverizing, fusing and pelletizing a waste material of the coated base fabric for airbags of the present invention.

It is preferable that a molded part made of the PA reproduced material has the following mechanical properties: tensile strength (ASTM D 638), tensile elongation (ASTM D 638), bending strength (ASTM D 790) and bending elastic modulus (ASTM D 790) of the PA reproduced material being 50% or more of those of a compact made of a reproduced material of a uncoated base fabric. Furthermore, it is preferable that a Charpy impact value (JIS K 7111) of the reproduced material of the coated base fabric for airbags is 35% or more (preferably 70% or more and more preferably 100% or more) of that of the reproduced material of the uncoated base fabric.

The present invention encompasses an airbag including the coated base fabric for airbags of the present invention and furthermore, an airbag device including the airbag.

BRIEF DESCRIPTION OF THE DRAWINGS

FIG. 5 is a histogram showing each of test results of tension strength, tensile elongation and bending strength of a reproduced material of a coated base fabric or the like.

DETAILED DESCRIPTION OF THE PREFERRED EMBODIMENTS

Figure 1:
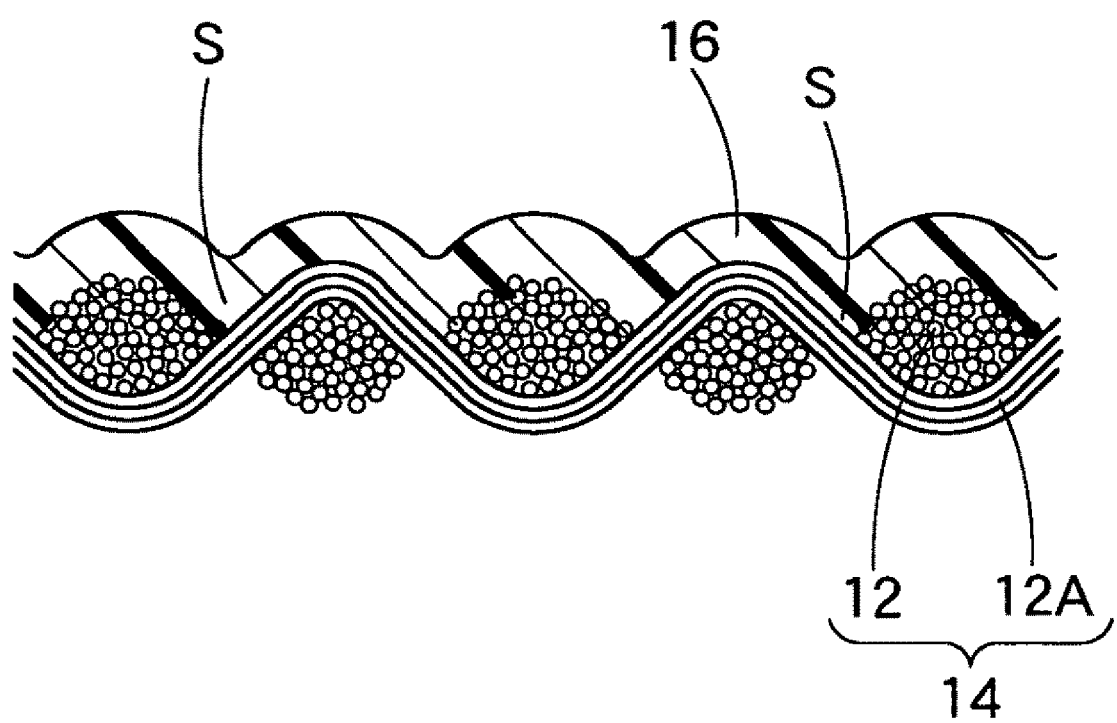
FIG. 1 is a sectional view illustrating a coated base fabric in the present invention.

Hereinafter, a preferable embodiment of the present invention will be described.

A coated base fabric for airbags of the present embodiment has a prerequisite constitution, the constitution including: a cloth obtained by weaving yarns made of a polyamide fiber; and an airflow-suppression coating film formed on at least one surface (one surface or both surfaces) of the cloth.

As a PA fiber of the yarn made of the PA fiber, for example, aliphatic polyamides such as nylon 66, nylon 6, nylon 46 and nylon 12; and aromatic polyamides such as aramid or the like are used. Of these, nylon 66 is preferable from the viewpoint of heat resistance and general versatility. The reason is as follows.

Nylon 66 (melting point: 250 to 260° C.), which has a melting point higher than those of nylon 6 (melting point: 215 to 220° C.), nylon 11 (melting point: 184 to 194° C.) and nylon 12 (melting point: 176 to 180° C.) as the other general-purpose nylon, has a larger heat capacity. Although nylon 46 (melting point: 290° C.) has a high melting point, nylon 46 is special and expensive. Although the aromatic polyamide has high mechanical strength and heat resistance, the aromatic polyamide has inferior abrasion resistance. The melting points of the above nylons are respectively and collectively quoted from "Kobunshi Daiziten (Polymer Great Dictionary)" (Maruzen Publication), p. 987, "Jitsuyo Purasuchikku Ziten (Practical Use Plastic Dictionary)" (Industry Research Center of Japan), p. 320, and "Kagaku Binran Oyohen Kaitei 3-han [Handbook of Chemistry; Edition of Application (III)]" (Maruzen Publication), p. 833.

Although the PA fiber yarn is different according to the types of the PA fiber, a multiple wound yarn of 200 to 700 dtex is normally used. For example, a nylon 66 multiple wound yarn which is 470 dtex using a multiple wound yarn of 72 filaments is used.

The mode of weaving of cloth is normally plain weaving. However, the mode may be twill weaving and sateen weaving.

The cover factor (K) of the cloth shown by the following formula is 1200 to 2400, preferably 1400 to 2100, more preferably 1600 to 2000, and most preferably 1800 to 2000. A cloth having a low cover factor, which has low airflow, brings about lessening weight and lowering cost of production of the airbag. When the cover factor is too low, predetermined mechanical strength is difficult to obtain, and a fusing resin penetrates and flows into textures of the cloth to make it difficult to secure air tightness and flexibility of the coated base fabric.

$$K = NW \times DW^{0.5} + NF \times DF^{0.5}$$

NW: warp density (threads/in), DW: warp fineness (denier),
NF: weft density (threads/in), DF: weft fineness (denier)

The excessively low or high cover factor (K) means that warp and weft densities and/or warp and weft finenesses are relatively low or high.

When the yarn density and/or fineness are/is too low, a cloth having predetermined mechanical strength is difficult to obtain. Furthermore, when the yarn density is low, yarn deviation may occur to collapse a texture form.

When the yarn density and/or fineness are/is too high, the rigidity of the cloth is difficult to settle in a predetermined value. Furthermore, when the yarn density is high, the cloth becomes thick to easily cause problems in the folding quality and the storability of the airbag.

A coating film 16 made of a PA elastomer is formed on one surface of a cloth 14 formed of PA fiber yarns (warp and weft) 12, 12A in FIG. 1. As described above, the coating film may be formed on both the surfaces of the cloth 14.

In the present invention, as shown in FIG. 1, it is preferable that the coating film 16, which is a layer formed as thinly as possible, has a macrostructure where the PA elastomer (resin) partially intrudes into recessed parts of one surface in the clearance between the textures in the cloth surface for securing the flexibility of the coated base fabric.

A PA elastomer is selected differently according to a type of the base fabrics. For example, when the base fabric (PA fiber) is nylon 66 (melting point: 250 to 260° C.), a block copolymer type thermoplastic elastomer (TPE) having the following characteristics may be preferably selected.

(1) Melting point: The melting point ranges from 135 to 200° C., preferably form 140 to 180° C., and more preferably from 155 to 165° C.

The difference between the melting points of the PA elastomer and PA fiber ranges from 80 to 120° C., preferably from 80 to 110° C., and more preferably from 85 to 105° C.

When the melting point of the PA elastomer is too high, the flexibility of the coated base fabric is difficult to secure properly because of the increase in rigidity in conjunction with a rise in the relative crystal rate of the elastomer. The airbag is difficult to fold and to obtain required development performance (smooth development characteristics caused by gas inflow into the airbag) at the time of developing the airbag. Conversely, when the melting point of the PA elastomer is too low, i.e., when the melting point is close to a vehicle use environmental upper limit temperature (normally 105° C.), the form of the coating film itself collapses and to secure the air tightness (low airflow amount) is difficult. Furthermore, the excessively low melting point of the PA elastomers easily increases the difference between the melting points of PA constituting the cloth (base fabric) and PA elastomer, and the quality of the reproduced material is difficult to secure.

(2) Tensile elongation (tensile rupture elongation) (ASTM D638, hereinafter, the same): The tensile elongation is ranges from 200% or more. When the tensile elongation is too low, the flexibility of the coated base fabric is difficult to secure and cracks may occur in the elastomer coating film by stress at the time of developing the airbag and the cracks make it difficult to secure predetermined air tightness.

(3) Bending elastic modulus (ASTM D790): The bending elastic modulus ranges from 200 or less MPa. When the bending elastic modulus is too high, the flexibility of the coated base fabric is difficult to secure. Although the bending elastic modulus is preferably lower, the lower limit thereof is normally 50 MPa.

(4) Balanced water absorption rate (equilibrium moisture content) (ASTM D570; 20° C.×65% RH): The balanced water absorption rate is 3% or less, and preferably 2% or less.

When the balanced water absorption rate is too high, the coating film may absorb moisture to induce the peeling of the coating film.

The present inventors confirm that a nylon elastomer having a balanced water absorption rate equal to or slightly lower than that (3.3 to 4.5%) of a fiber made of nylon 66 is advantageous for enhancing the adhesiveness of the coating film.

As described above, "TORESIN" has water vapor permeability close to that of cellulose, and the balanced water absorption rate of "TORESIN" is assumed to be far higher than that of nylon 66.

(5) An environmental load substance (material) is not included. For example, "TORESIN" (N-methoxymethylated nylon) contains residual formalin. It is preferable that the environmental load substance is not contained from the viewpoint of recycling.

The types of PA elastomers are not particularly limited as long as the PA elastomers satisfy the above characteristics (1) and (2) to (5), and the following various types can be used. Of these, a block copolymer type PA elastomer is preferable since the block copolymer type PA elastomer can easily provide a PA elastomer having a melting point (heat resistance) and flexibility (tensile elongation and bending elastic modulus) required in the present invention.

(1) Block copolymer type: PEBA (polyether block polyamide) represented by the following structural formula using a PA block as a hard segment and using a polyether (PE) block as a soft segment can be preferably used. Herein, nylon 6, nylon 66, nylon 11 and nylon 12 or the like can be used as PA. Nylon 11 or nylon 12 is preferable, and nylon 12 is more preferable. Nylon 12 has a long polymethylene chain and a low amide bonding density in the polyamide. Therefore, nylon 12, which is the softest in PA, has excellent shock resistance and low temperature characteristics or the like.

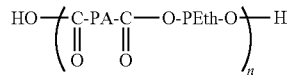

Examples of polyethers include polytetramethylene ether glycol and polypropylene glycol. The soft segment may be a polyester block such as aliphatic polyester diol.

(2) Crystalline-reduced type: The crystalline-reduced type is obtained by carrying out the graft polymerization of a functional group (for example, an alkoxyalkyl group) to a nylon molecule chain and separating the distance between molecules to reduce an intermolecular attractive force to reduce the crystallinity.

(3) Polymer alloy type: The polymer alloy type has a sea-island structure where rubber fine particles such as EPDM are dispersed in a PA resin.

(4) Plasticizer type: The plasticizer type is obtained by adding a plasticizer into PA to soften PA. Examples of the plasticizers include butylbenzenesulfonamide, N-alkyltoluenesulfonamide, hexylene glycol, and p-oxybenzoic acid ester-2.

The above PA elastomer is coated onto the cloth as a dispersion liquid (emulsion) or a solution.

The particle diameter of the PA elastomer dispersed in the emulsion is normally selected arbitrarily from the range of 0.05 to 5 µm, preferably 0.2 to 5 µm, and more preferably 0.2 to 1 µm.

Examples of modes of the emulsion include the following commonly-used methods.

(1) Solvent substitution method: Dissolving a polymer in a solvent and then adding an emulsifier and water into the solvent to carry out a phase inversion (the solvent is collected).

(2) Pressure method: Stirring a polymer, an emulsifier and water in a container at a high temperature and high pressure to emulsify the polymer.

(3) Machine emulsifying method: Carrying out emulsification by a mechanical shearing force with a biaxial extruder (extruder).

When a solution is produced, for example, cyclohexanone and cresol or the like are used.

Examples of coating methods carried out using the emulsion or solution of the above PA include knife coating (die coating), roller coating (national, reverse), brush coating and spray coating when the emulsion or the solution is coated onto one surface. Among these, the knife coating is preferable. This is because a thin elastomer coating film is easily formed on one surface of the cloth with the emulsion or the solution impregnating into the surface layer of the multiple wound yarn and the PA infiltrating into the recessed parts S of one surface in the clearance between the textures in the cloth surface. As a result, the flexibility of the coated base fabric is easily secured.

When the emulsion or the solution is coated onto both the surfaces, for example, dipping (immersion coating) is used.

This coating amount (dry weight reference) is selected arbitrarily from the range of 3 to 100 $gm^{-2}$, preferably 5 to 25 $gm^{-2}$, and more preferably 5 to 15 $gm^{-2}$ from the balance of the airflow amount and flexibility (folding quality) required in the airbag.

After the application, a heat treatment (fusing treatment) is usually carried out in order to stick (fuse) the PA coating film to the cloth. For this heat treatment condition, it is preferable that the PA coating film does not pass a constricted part (a bottleneck: a minimum clearance part) continuing to the recessed parts S of one surface in the clearance between the textures of the cloth in a surface layer fusing state to the multiple wound yarn (has a macrostructure of partial invasion). This is because the flexibility of the coated base fabric is maintained (secured). When the multiple wound yarn is impregnated with the PA up to the interior thereof and/or the PA passes the constricted part of the clearance between the texture and the coating film is also formed on the back surface, the rigidity of the coated base fabric is increased, and thereby the flexibility thereof is difficult to secure.

The heat treatment is carried out at a temperature higher than the melting point of PA (elastomer) for forming the coating film by 5 to 30° C. (preferably 10 to 20° C.) and lower than the melting point of PA (fiber) for forming the cloth by 30° C. or more (preferably 50° C. or more) for 0.5 to 10 minutes (preferably 0.5 to 5 minutes). When the difference between melting points of the PA (fiber) for forming the cloth and PA for forming the coating film is small at the treatment temperature, the PA for forming the coating film is difficult to sufficiently fluidize. In addition, wettability with regard to the cloth is difficult to obtain, and thereby required adhesiveness (fusing property) can not be obtained. On the contrary, when the difference between the treatment temperature and the melting point of the PA for forming the coating film is too large, the fusing fluidity of the PA elastomer is increased. When the cloth has a excessively large cover factor, the PA elastomer easily infiltrates (penetrates) into the clearance between the texture. This may suppress the flexibility of the coated base fabric. That is, a temperature difference lower than the melting point of the PA fiber for forming the cloth by 30° C. or more (preferably 50° C. or more) makes difficult to provide the airbag of the present invention.

Thus, as shown in Examples to be described later, the coated base fabric having an airflow amount (a high pressure airflow-measuring device 20 KPa) of 0.4 $Lcm^{-2}min^{-1}$ or less, and preferably 0.2 $Lcm^{-2}min^{-1}$ or less, and impact resilience (ASTMD 726; a Gurley tester) of 120 g or less, and preferably 80 g or less can be easily obtained by producing the coated base fabric according to the present invention.

EXAMPLES

Hereinafter, Examples carried out with Contrast Examples and Conventional Examples will be described in order to support the advantageous effect of the present invention.

As the used PA elastomer, a commercially available article made of PEBA having the following characteristics was used.

(1) Melting point (ASTM D3418): 160° C.

(2) Tensile elongation (ASTM D638): 450%

(3) Bending elastic modulus (ASTM D790) (ISO 178): 84 MPa (4) Balanced water absorption rate (ASTM D570; 20° C.×65% RH): 0.5%

(5) Water absorption rate (ASTM D 570; 20° C., underwater, 24 h): 1.2%

Samples of each of Examples and Comparative Examples were prepared by coating the PA elastomers onto a uncoated base fabric (cloth) of the following specification and heat-treating the PA elastomers (see Table 1) on each of the following conditions. Each of the coating amounts is a dry weight reference.

TABLE 1

| | Base fabric cover factor | Coating agent | Coating method | Coating amount/$gm^{-2}$ | Film formation state |
|---|---|---|---|---|---|
| Example 1 | 1892 | PEBA | Knife | 12 | Fusing |
| Example 2 | 1892 | PEBA | Dip | 7 | Fusing |
| Example 3 | 1892 | PEBA | Knife | 20 | Fusing |
| Comparative Example 1 | 1892 | PEBA | Brush | 7 | No fusing |
| Nylon | 1892 | Commercially available PA | Knife | 20 | Fusing |
| Contrast Example | 2094 | Uncoated | — | — | — |
| Conventional Example | 1892 | Silicone Rubber | Knife | 22 | Cross-linking adhesion |

(1) Base Fabric for Airbags

Contrast Example

Uncoated . . . plain weaving of nylon 66 multiple wound yarns of 350 dtex (315 denier), (warp yarn: 59 threads/in, woof yarn: 59 threads/in), cover factor $(K)=59\times(315)^{0.5}+59\times(315)^{0.5}=2094$ Example 1

PEBA-coated . . . The PA elastomer is coated onto the following treated cloth (uncoated) (knife coating), and the coated resin was then heat-treated (heat-fused) at 175° C. for 2 minutes to prepare a coated base fabric of a coating amount of 12 $gm^{-2}$.

Plain weaving of nylon 66 multiple wound yarns of 470 dtex (423 denier), (warp yarn: 46 threads/in, woof yarn: 46 threads/in), cover factor $(K)=46\times(423)^{0.5}+46\times(423)^{0.5}=1892$ Comparative Example 1

PEBA-coated . . . A coated base fabric (coating amount: 7 $gm^{-2}$) was prepared in the same manner as in Example 1 except that the heat treatment (drying) was carried out at 90° C. for 15 minutes.

Example 2

PEBA-coated . . . The PA elastomer was coated (dipped) onto the treated cloth used in Example 1 and was heated and fused at 175° C. for 2 minutes to form (dry) a film to prepare a coated base fabric (coating amount: 7 $gm^{-2}$).

Example 3

PEBA-coated . . . The PA elastomer was coated (knife coating) onto the treated cloth used in Example 1 and was dried at 175° C. for 2 minutes to prepare a coated base fabric (coating amount: 20 gm$^{-2}$).

Conventional Example

Silicone rubber coating . . . A conventional article coated by carrying out knife coating of a silicone rubber onto the above uncoated cloth, vulcanized and cured, the article produced by the applicant (coating amount: 22 gm$^2$).

A test of each of the following items for each of the samples prepared above was carried out in accordance with each of the testing methods. The Comparative Example for impact resilience is obtained by coating a commercially available nylon emulsion liquid.

(1) Airflow amount: The airflow amount is measured by using "a high pressure airflow-measuring device" manufactured by Cosmo Instruments Co., Ltd., and increasing a pressure at 10 kPa pitch between 10 and 50 kPa. Hereinafter, the inside of the parentheses after the airflow amount means a pressure level measured by the high pressure airflow-measuring device.

(2) Impact Resilience: ASTM D 726 (JIS L 1096)

Figure 2:
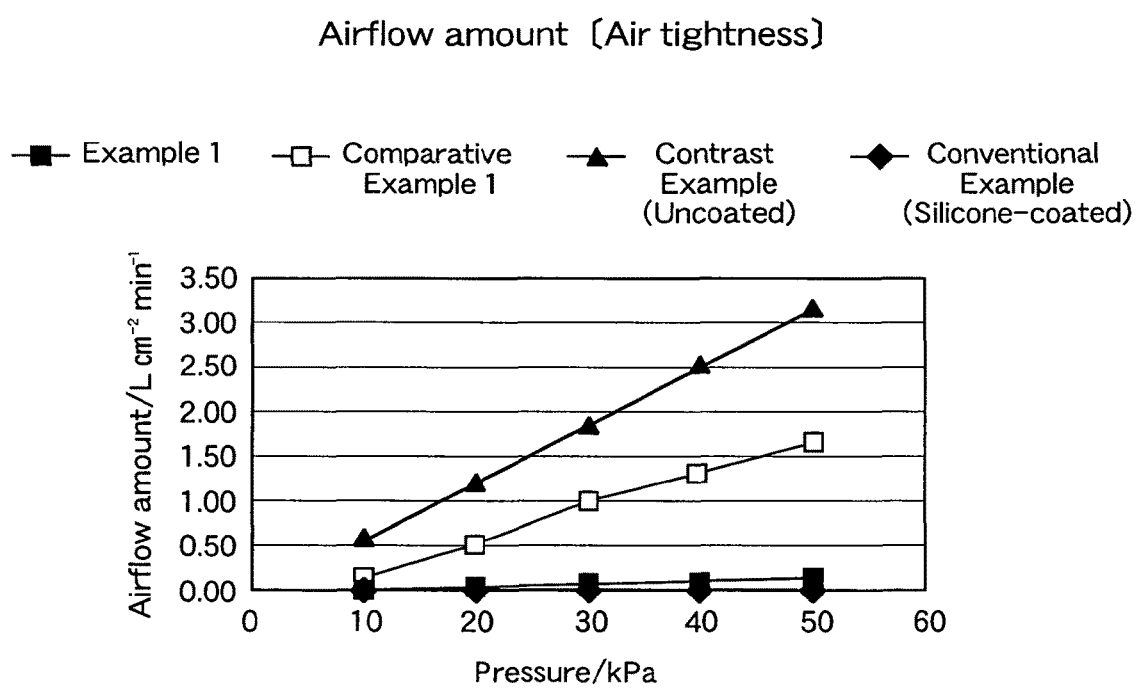
FIG. 2 is an airflow amount/pressure relationship diagram showing test results of airflow amounts in coated and uncoated base fabrics of Example 1, Comparative Example 1, Conventional Example, and Contrast Example.
Figure 3:
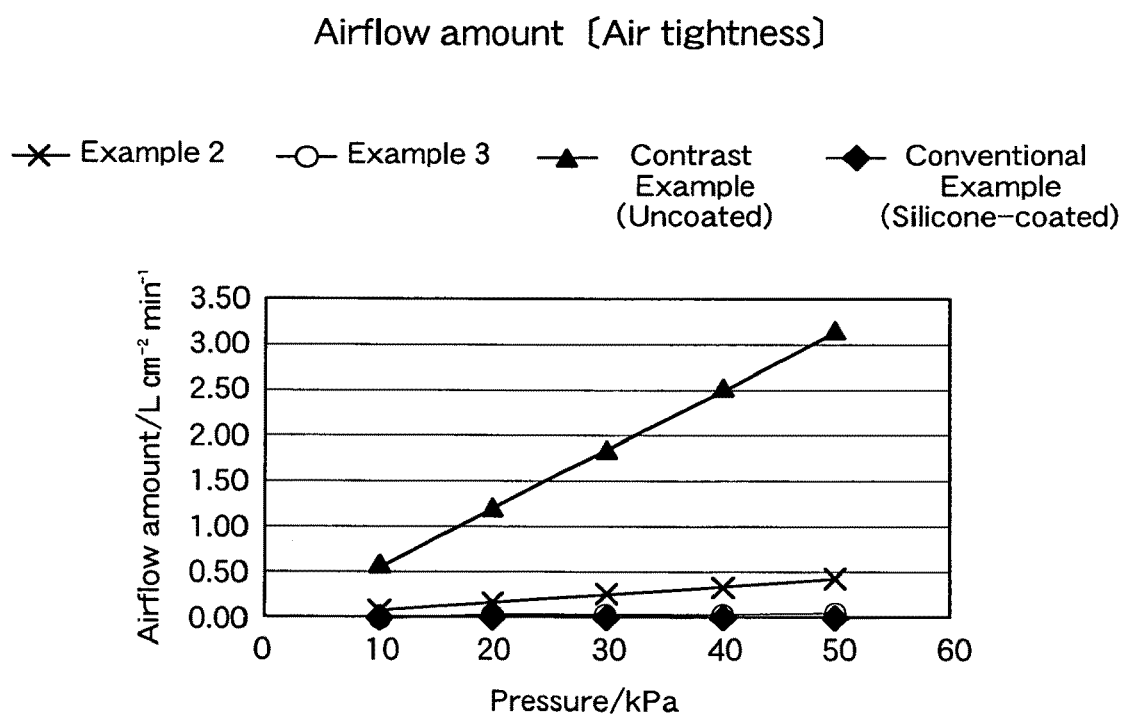
FIG. 3 is an airflow amount/pressure relationship diagram showing test results of airflow amounts in coated and uncoated base fabrics of Examples 2 and 3, Conventional Example and Contrast Example.
Figure 4:
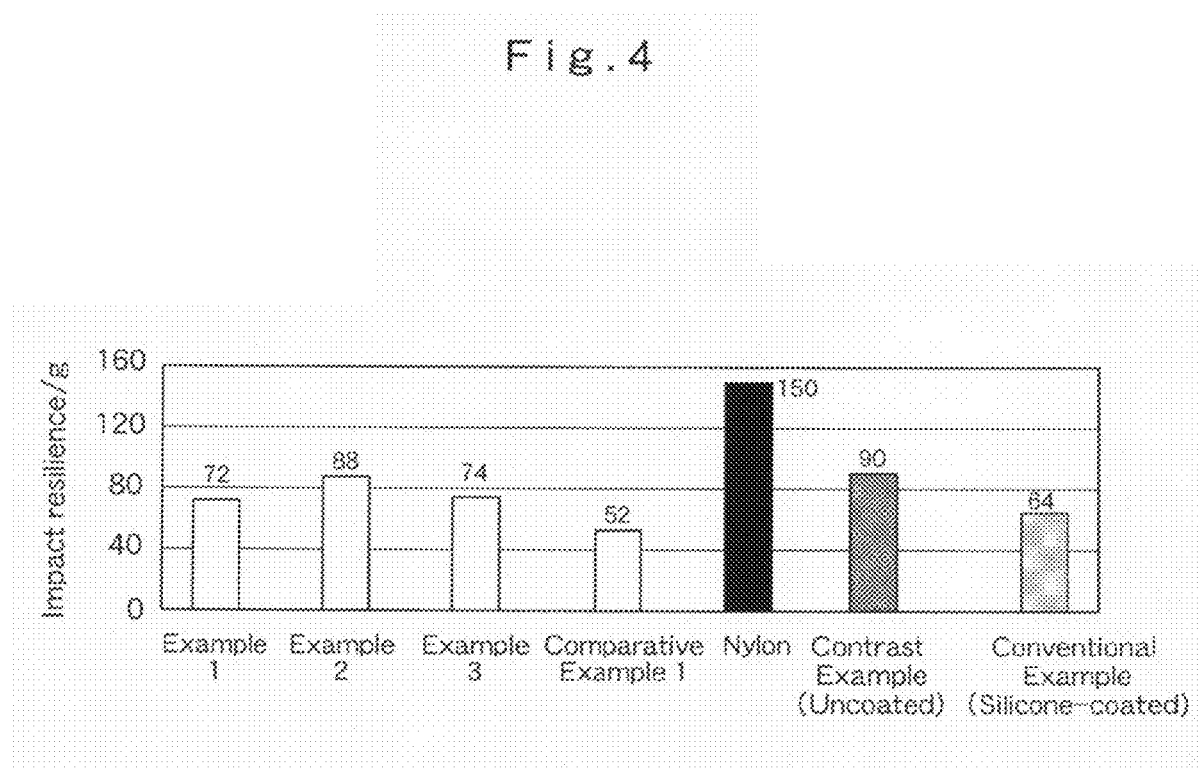
FIG. 4 is a histogram showing test results of impact resiliences thereof.

Table 2 and FIGS. 2 and 3 show the examination results of the above items (1) and (2).

TABLE 2

| | Airflow amount/Lcm$^{-2}$min$^{-1}$ | | | | |
|---|---|---|---|---|---|
| | 10 kPa | 20 kPa | 30 kPa | 40 kPa | 50 kPa |
| Example 1 | 0.03 | 0.05 | 0.08 | 0.11 | 0.15 |
| Example 2 | 0.08 | 0.16 | 0.24 | 0.33 | 0.42 |
| Example 3 | 0 | 0.02 | 0.02 | 0.02 | 0.03 |
| Comparative Example 1 | 0.18 | 0.50 | 1.00 | 1.31 | 1.67 |
| Contrast Example (Uncoated) | 0.58 | 1.20 | 1.83 | 2.50 | 3.17 |
| Conventional Example (Silicone rubber) | 0.00 | 0.00 | 0.00 | 0.00 | 0.00 |

Each of the Examples of the present invention was slightly inferior to the silicone rubber-coated base fabric of the Conventional Example. However, the present inventors confirmed that practicable air tightness (airflow amount) and flexibility (impact resilience) were shown in air tightness and flexibility. Herein, the term "practicable" means the airflow amount (20 Kpa) of 0.4 Lcm$^{-2}$min$^{-1}$ or less, and preferably 0.2 Lcm$^{-2}$min$^{-1}$ or less and the flexibility (impact resilience) of 120 g or less, and preferably 80 g or less. More preferably, the term "practicable" means the airflow amount (50 Kpa) of 0.50 Lcm$^{-2}$min$^{-1}$ or less when the maximum internal pressure is assumed in operating the airbag, most preferably 0.10 Lcm$^{-2}$min$^{-1}$ or less. Each of the Examples satisfies the preferable or most preferable characteristics.

And, the present inventors could confirm the following. The impact resilience of Comparative Example 1, which is 52 g, was lower and more flexible than the impact resilience of 88 g of Example 2. However, the air tightness (20 kPa) is 0.5 Lcm$^{-2}$min$^{-1}$, and practicable minimum air tightness and airflow amount (20 kPa) of 0.4 Lcm$^{-2}$min$^{-1}$ or less were difficult to secure.

Further, referring to the impact resilience, Examples 1 and 3 of a few coating amounts as one surface coating (knife coating) are smaller than Example 2 of coating (dipping) of both surfaces of more coating amounts. That is, the present inventors could confirm that, in the case of dipping, there were more permeation amounts of the PA elastomer (resin) into the clearance between the textures of the cloth, and as a result, the rigidity of the base fabric was increased even in a few coating amounts. On the other hand, the present inventors could confirm that the permeation of the PA elastomer (resin) into the clearance between the textures of the cloth was suppressed in the knife coating to easily secure the flexibility of the coated base fabric.

Furthermore, a PA reproduced material (pellet) was prepared on a pelletizer operating condition: 180 rpm and 280° C. by crushing and pelletizing each of the base fabrics of Example 1 (PA coated) and Contrast Example (uncoated) prepared above using uncoated base fabric reproduction equipment of the applicant provided with a crusher/pelletizer (nominal diameter: 46 mm).

A mold held at a room temperature was filled with a melt obtained by fusing each of the PA reproduced materials (pellet) in an injection machine (cylinder internal temperature: 270° C.), and the melt was cooled and solidified to prepare each of the samples.

The mechanical property of each of the following items was examined for each of the samples.

(a) Tension strength, Tensile elongation: ASTM D638
(b) Bending elastic modulus: ISO 178
(c) Bending strength: ASTM D 790
(d) Charpy impact value: JIS K 7111

Figure 5:
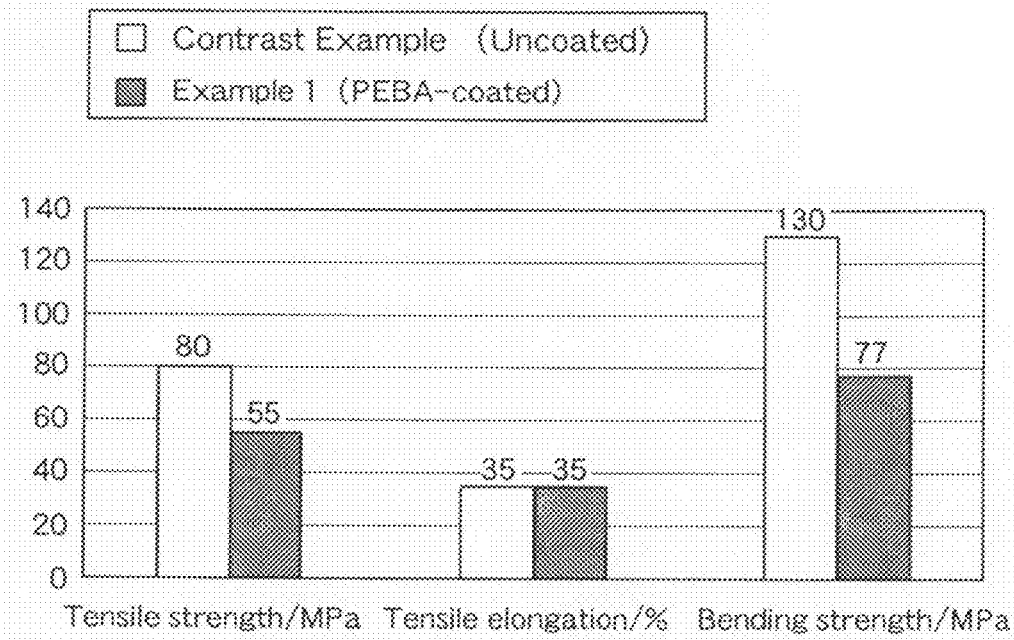
Figure 6:
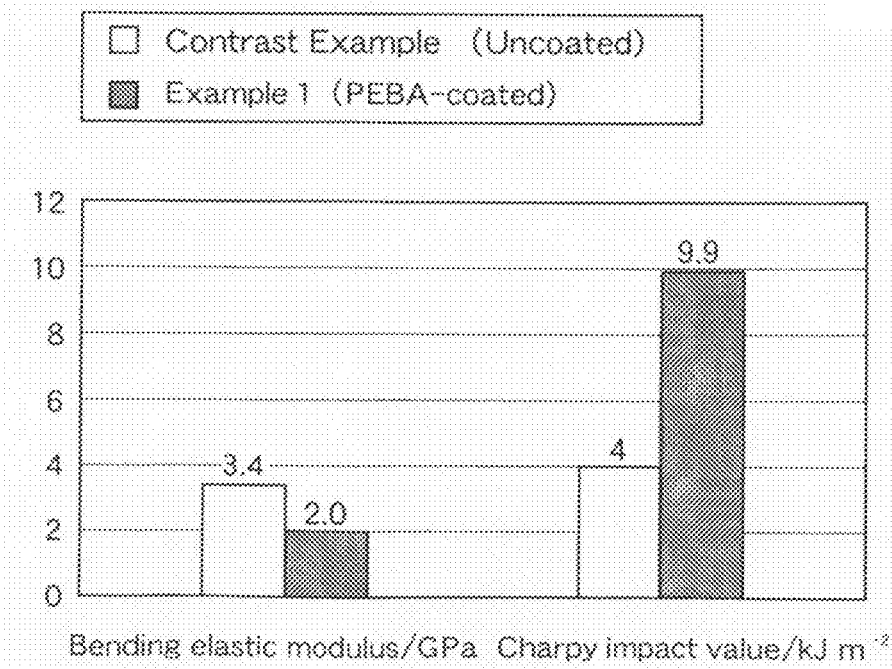
FIG. 6 is a histogram showing each of test results of bending elastic modulus and Charpy impact value thereof.

FIGS. 5 and 6 show the examination results. The present inventors could confirm that the tension strength, tensile elongation, bending strength and bending elastic modulus of the coated base fabric of the present invention were 50% or more of those of the reproduced material of the uncoated base fabric. That is, the tension strength, the tensile elongation, the bending strength and the bending elastic modulus were respectively 70%, 100%, 60% and 57%. Alternatively, the present inventors could confirm that the Charpy impact value of the coated base fabric was 2.475 times (247.5%) of that of the uncoated base fabric, and showed a large value of 100% or more of that of the uncoated base fabric, the value sufficiently preferred.

What is claimed is:

1. A coated base fabric for airbags comprising:
   a cloth obtained by weaving yarns made of a polyamide (PA) fiber, the cloth having at least one surface with recessed parts thereon, the recessed parts being formed by and between warps and wefts of the cloth; and
   a coating film formed on one surface of the cloth with recessed parts, the coating film made of a PA elastomer and formed from one of a liquid dispersion and a solution containing the PA elastomer, the coating not passing the minimum clearance part of each recessed part, wherein the minimum clearance part of each recessed part is the portion of the recessed part having the minimum distance between the warp and weft of the cloth that form the recessed parts,
   wherein the PA elastomer has a melting point (ASTM D3418, hereinafter, the same) of 135 to 200° C.; a bending elastic modulus (ASTM D790) of the PA elastomer ranges from about 50 Mpa to about 200 Mpa; a difference between the melting points of the PA elastomer and PA fiber ranging from 80 to 120° C.; and the coating film being fused on the cloth.

2. The coated base fabric for airbags according to claim 1, wherein the coating film is formed with a coating amount of 5 to 25 gm$^{-2}$ and a cover factor of 1200 to 2400 on the coated surface of the cloth with recessed parts thereon.

3. The coated base fabric for airbags according to claim 2, wherein the coating film is formed on the coated surface of the cloth with recessed parts thereon; and the coated base fabric shows the following characteristics: impact resilience (ASTM D726; a Gurley tester, hereinafter, the same) of 120 g or less; and an airflow amount (under 20 KPa according to a high pressure airflow-measuring device, hereinafter, the same) of 0.4 $Lcm^{-2}$ $min^{-1}$ or less.

4. The coated base fabric for airbags according to claim 3, wherein the PA elastomer is a block copolymer; and the coated base fabric shows the following characteristics: impact resilience of 80 g or less; and an airflow amount of 0.2 $Lcm^{-2}$ $min^{-1}$ or less.

5. The coated base fabric for airbags according to claim 4, wherein the PA fiber is made of nylon 66; and the PA elastomer is in range of a melting point of 140 to 180° C. and is a block copolymer having a hard segment (polyamide) made of nylon 12 or nylon 11 and a soft segment made of a polyether block.

6. An airbag comprising the coated base fabric for airbags of claim 1.

7. An airbag device comprising the airbag according to claim 6.

8. A method for producing the coated base fabric for airbags of claim 1, wherein a water dispersion-based coating material having a polymer particle diameter of 0.05 to 5 μm is used as a coating material of the coating film; and the coating material is heat-treated at a temperature higher than the melting point of the PA elastomer by 5 to 30° C. for 0.5 to 5 minutes after the coating material is coated to form the coating film.

* * * * *